United States Patent
You et al.

(10) Patent No.: US 12,349,214 B2
(45) Date of Patent: Jul. 1, 2025

(54) COMMUNICATION METHOD FOR ALLOCATING SPECTRUM RESOURCE IN A SIDELINK COMMUNICATION AND APPARATUS

(71) Applicant: HUAWEI TECHNOLOGIES CO., LTD., Shenzhen (CN)

(72) Inventors: Chunhua You, Shanghai (CN); Qufang Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 394 days.

(21) Appl. No.: 17/707,206

(22) Filed: Mar. 29, 2022

(65) Prior Publication Data
US 2022/0225442 A1 Jul. 14, 2022

Related U.S. Application Data

(63) Continuation of application No. PCT/CN2019/109750, filed on Sep. 30, 2019.

(51) Int. Cl.
*H04W 76/11* (2018.01)
*H04L 1/1812* (2023.01)
(Continued)

(52) U.S. Cl.
CPC .......... *H04W 76/11* (2018.02); *H04L 1/1812* (2013.01); *H04L 5/0048* (2013.01); *H04L 5/0055* (2013.01); *H04W 76/15* (2018.02)

(58) Field of Classification Search
CPC ..... H04W 76/11; H04W 76/15; H04W 72/23; H04W 76/14; H04W 76/19; H04W 24/08;
(Continued)

(56) References Cited

U.S. PATENT DOCUMENTS

| 2015/0139176 A1* | 5/2015 | Morita | H04L 5/0055 370/330 |
| 2015/0215903 A1* | 7/2015 | Zhao | H04W 72/04 370/329 |

(Continued)

FOREIGN PATENT DOCUMENTS

| CN | 109314965 A | 2/2019 |
| WO | 2018059456 A1 | 4/2018 |

(Continued)

OTHER PUBLICATIONS

ASUSteK, Discussion on sidelink retransmission indication over Uu. 3GPP TSG-RAN WG2 Meeting #106, Reno, USA, May 13-17, 2019, R2-1906543, 4 pages.

ZTE Corporation, Sanechips, Consideration on sidelink RLM management. 3GPP TSG RAN WG2 Meeting #106, Reno, USA, May 13-17, 2019, R2-1906477, 5 pages.

International Search Report issued in corresponding International Application No. PCT/CN2019/109750, dated Jun. 22, 2020, pp. 1-15.

(Continued)

*Primary Examiner* — Tejis Daya
(74) *Attorney, Agent, or Firm* — HAUPTMAN HAM, LLP

(57) ABSTRACT

A communication method and apparatus are provided. The method includes: A first terminal device determines first information, where the first information includes a result of a channel access process performed on a first resource, and the first resource is used for sidelink communication between the first terminal device and a second terminal device, or is used for communication between the first terminal device and a network device; or the first information includes a resource request message, and the resource request message is used to request a resource for retransmission on a sidelink between the first terminal device and a second terminal device; and the first terminal device sends the first information to the network device.

18 Claims, 3 Drawing Sheets

(51) Int. Cl.
*H04L 5/00* (2006.01)
*H04W 76/15* (2018.01)

(58) Field of Classification Search
CPC .... H04W 92/18; H04L 1/1812; H04L 5/0048; H04L 5/0055; H04L 1/1822
See application file for complete search history.

(56) References Cited

U.S. PATENT DOCUMENTS

| | | | | |
|---|---|---|---|---|
| 2015/0271861 | A1* | 9/2015 | Li | H04W 76/14 455/552.1 |
| 2017/0347394 | A1* | 11/2017 | Yasukawa | H04L 1/189 |
| 2018/0048498 | A1* | 2/2018 | Stern-Berkowitz | H04L 5/0091 |
| 2018/0368090 | A1* | 12/2018 | Kadambar | H04W 8/005 |
| 2019/0059094 | A1* | 2/2019 | Kaur | H04W 76/14 |
| 2019/0150196 | A1* | 5/2019 | Koorapaty | H04L 1/1812 370/329 |
| 2021/0092783 | A1* | 3/2021 | Sun | H04W 74/0875 |
| 2021/0160014 | A1* | 5/2021 | Selvanesan | H04L 1/1819 |
| 2022/0095117 | A1* | 3/2022 | Liu | H04W 74/0808 |
| 2022/0095369 | A1* | 3/2022 | Xue | H04L 5/001 |

FOREIGN PATENT DOCUMENTS

| | | | |
|---|---|---|---|
| WO | 2018170655 A1 | 9/2018 | |
| WO | 2019028842 A1 | 2/2019 | |
| WO | WO-2020147046 A1 * | 7/2020 | ............... H04L 1/08 |

OTHER PUBLICATIONS

Google: "Consistent LBT failure detection and recovery", 3GPP Draft; R2-1910688 Consistent LBT Failure Detection and Recovery, vol. RAN WG2, no. Prague, Czech Republic; Aug. 26, 2019-Aug. 30, 2019 Aug. 15, 2019 (Aug. 15, 2019), pp. 1-5.

Nokia et al: "UL LBT failure handling", 3GPP Draft; R2-1910091 UL LBT Failure Handling, vol. RAN WG2, no. Prague, Czech Republic; Aug. 26, 2019-Aug. 30, 2019 Aug. 16, 2019 (Aug. 16, 2019), total 4 pages.

Ericsson: "Handling uplink LBT failures", 3GPP Draft; R2-1910779 -Handling UL LBT Failures, vol. RAN WG2, no. Prague, Czech Republic; Aug. 26, 2019-Aug. 30, 2019 Aug. 15, 2019 (Aug. 15, 2019), total 4 pages.

Samsung: "On indicating LBT failure for NR-U", 3GPP Draft; R2-1909174, vol. RAN WG2, no. Prague, Czech Republic; Aug. 26, 2019-Aug. 30, 2019 Aug. 16, 2019 (Aug. 16, 2019), 1 page.

Vivo: "Discussion on SR/BSR for NR Sidelink mode 1", 3GPP Draft; R2-1903631_Discussion on SR SBR for NR Sidelink Mode 1, vol. RAN WG2, no. Xi"an, China; Apr. 8, 2019-Apr. 12, 2019 Apr. 6, 2019 (Apr. 6, 2019), total 5 pages.

Anonymous: "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, vol. RAN WG2, No. V15.7.0 Sep. 27, 2019 (Sep. 27, 2019), pp. 1-962.

Extended European Search Report issued in corresponding European Application No. 19948104.5, dated Aug. 29, 2022, pp. 1-19.

* cited by examiner

COMMUNICATION METHOD FOR ALLOCATING SPECTRUM RESOURCE IN A SIDELINK COMMUNICATION AND APPARATUS

CROSS-REFERENCE TO RELATED APPLICATIONS

This application is a continuation of International Application No. PCT/CN2019/109750, filed on Sep. 30, 2019, the disclosure of which is hereby incorporated by reference in its entirety.

BACKGROUND

In a new radio (new radio, NR) system, communication of a terminal device is classified into Uu air-interface communication and sidelink (sidelink, SL) communication. The Uu air-interface communication is communication that is between the terminal device and a base station and that is on an air interface resource. The sidelink communication is communication that is between terminal devices and that is on a sidelink resource.

The terminal device needs to obtain a resource before the sidelink communication. Currently, a sidelink resource allocation manner includes the following two modes: One is a network device allocation mode, as an example, a network device allocates, to the terminal device by using downlink control information, a resource for communication on the sidelink resource. The other is a terminal device self-selection mode, as an example, the terminal device selects a resource for communication on the sidelink resource.

In the foregoing two modes, the resource allocated by the network device is a licensed spectrum resource, or is an unlicensed spectrum resource. Currently, there is no solution for how the network device allocates the unlicensed spectrum resource.

SUMMARY

An objective of implementations of this application is to provide a communication method and apparatus, to resolve a problem of how a network device allocates an unlicensed spectrum resource on a sidelink.

According to a first aspect, an embodiment of this application provides a communication method, including: A first terminal device determines first information, where the first information includes a result of a channel access process performed on a first resource, and the first resource is used for sidelink communication between the first terminal device and a second terminal device, or is used for communication between the first terminal device and a network device; or the first information includes a resource request message, and the resource request message is used to request a resource for retransmission on a sidelink between the first terminal device and a second terminal device; and the first terminal device sends the first information to the network device.

According to the foregoing method, the first terminal indicates the first information to the network device, so that the network device determines, based on the first information, the result of the channel access process performed on the first resource, or determines the resource requested by the first device for retransmission. In this way, the network device determines, based on the first information, whether to allocate a resource to the first device, so that resource allocation effectiveness is improved.

In a possible implementation, that a first terminal device determines first information includes: When receiving second information from the network device, the first terminal device determines the first information, where the second information is used to indicate the first terminal device to send the first information; when receiving third information or the second information from the network device, the first terminal device starts or restarts a first timer, and when the first timer expires, the first terminal device determines the first information, where the third information is used to indicate a part or all of resources in the first resource; or when determining that a quantity of times for which the channel access process fails on the first resource is equal to a preset quantity, the first terminal device determines the first information.

In some embodiments, the quantity of times for which the channel access process fails on the first resource is a quantity of times for which the first terminal device fails to perform the channel access process on a unicast resource in the first resource; is a quantity of times for which the first terminal device fails to perform the channel access process on a multicast resource in the first resource; is a quantity of times for which the first terminal device fails to perform the channel access process on a broadcast resource in the first resource; is a quantity of times for which the first terminal device fails to perform the channel access process on a multicast resource and a broadcast resource in the first resource; is a quantity of times for which the first terminal device fails to perform the channel access process on a unicast resource and a broadcast resource in the first resource; is a quantity of times for which the first terminal device fails to perform the channel access process on a multicast resource and a unicast resource in the first resource; is a quantity of times for which the first terminal device fails to perform the channel access process on a resource that is a part of a preset channel and that is in the first resource; is a quantity of times for which the first terminal device fails to perform the channel access process on a resource that is a part of a preset subband and that is in the first resource; or is a total quantity of times for which the first terminal device fails to perform the channel access process on the first resource.

In some embodiments, the first information further includes any one or more of the following:

at least one sidelink carrier identifier, where the at least one sidelink carrier identifier is an identifier of a sidelink carrier corresponding to a resource that is in the first resource and on which the channel access process fails, or the at least one sidelink carrier identifier is an identifier of a sidelink carrier corresponding to a resource that is in the first resource and on which the channel access process succeeds;

at least one sidelink hybrid automatic repeat request HARQ identifier, where the at least one sidelink HARQ identifier is a sidelink HARQ identifier corresponding to a resource that is in the first resource and on which the first terminal device fails to send a transport block, or the at least one sidelink HARQ identifier is a sidelink HARQ identifier corresponding to a resource that is in the first resource and on which the first terminal device successfully sends a transport block;

channel access process type information, used to indicate a type of the channel access process performed by the first terminal device on the first resource;

channel access priority class information, used to indicate a channel access priority class CAPC used by the first terminal device to perform the channel access process on the first resource;

information about a quantity of times for which the channel access process fails, used to indicate a quantity of times for which the channel access process is performed, where the quantity corresponds to each resource that is in the first resource and on which the channel access process fails; and sidelink type information, used to indicate a resource type corresponding to a resource that is in the first resource and on which the channel access process fails.

In some embodiments, the method further includes: When determining that the quantity of times for which the channel access process fails on the first resource is equal to the preset quantity, the first terminal device starts a second timer, and performs a radio link restoration process during running of the second timer.

In some embodiments, the method further includes: When the second timer expires, if the radio link restoration process fails, the first terminal device triggers a radio link re-establishment process.

According to a second aspect, a communication method is provided, including: A network device obtains first information from a first terminal device, where the first information includes a result of a channel access process performed on a first resource, and the first resource is used for sidelink communication between the first terminal device and a second terminal device, or is used for communication between the first terminal device and the network device; or the first information includes a resource request message, and the resource request message is used to request a resource for retransmission on a sidelink between the first terminal device and a second terminal device; and the network device allocates a second resource to the first terminal device based on the first information.

According to the foregoing method, the network device determines, based on the first information, the result of the channel access process performed on the first resource, or determines the resource requested by the first device for retransmission, and allocates the second resource to the first terminal device. Because the second resource allocated by the network device is targeted, resource allocation effectiveness is improved.

In some embodiments, the second resource is used for the sidelink communication between the first terminal device and the second terminal device or is used for the communication between the first terminal device and the network device.

In some embodiments, the first information further includes any one or more of the following:

at least one sidelink carrier identifier, where the at least one sidelink carrier identifier is an identifier of a sidelink carrier corresponding to a first resource that is in the first resource and on which the channel access process fails, or the at least one sidelink carrier identifier is an identifier of a sidelink carrier corresponding to a resource that is in the first resource and on which the channel access process succeeds;

at least one sidelink hybrid automatic repeat request HARQ identifier, where the at least one sidelink HARQ identifier is a HARQ identifier corresponding to a resource that is in the first resource and on which the first terminal device fails to send a transport block, or the at least one sidelink HARQ identifier is a HARQ identifier corresponding to a resource that is in the first resource and on which the first terminal device successfully sends a transport block;

channel access process type information, used to indicate a type of the channel access process performed by the first terminal device on the first resource;

channel access priority class information, used to indicate a channel access priority class CAPC used by the first terminal device to perform the channel access process on the first resource;

information about a quantity of times for which the channel access process fails, used to indicate a quantity of times for which the channel access process is performed, where the quantity corresponds to each resource that is in the first resource and on which the channel access process fails; and sidelink type information, used to indicate a resource type corresponding to a resource that is in the first resource and on which the channel access process fails.

According to a third aspect, this application further provides a communication apparatus. The communication apparatus has a function of implementing any method provided in the first aspect or the second aspect. The communication apparatus is implemented by hardware, or is implemented by hardware executing corresponding software. The hardware or the software includes one or more units or units corresponding to the foregoing function.

In some embodiments, the communication apparatus includes a processor, and the processor is configured to support the communication apparatus in performing a corresponding function of the first terminal device or the network device in the foregoing method. The communication apparatus further includes a memory, and the memory is coupled to the processor, and stores program instructions and data that are for the communication apparatus. Optionally, the communication apparatus further includes a communication interface, and the communication interface is configured to support communication between the communication apparatus and a device such as the first terminal device or the network device.

In some embodiments, the communication apparatus includes corresponding functional units, respectively configured to implement the steps in the foregoing method. The function is implemented by hardware, or is implemented by hardware executing corresponding software. The hardware or the software includes one or more units corresponding to the foregoing function.

In some embodiments, a structure of the communication apparatus includes a processing unit and a communication unit. These units performs corresponding functions in the foregoing method examples. For details, refer to the descriptions in the method provided in the first aspect or the second aspect. Details are not described herein again.

According to a fourth aspect, this application provides a communication apparatus, including a processor and a memory. The memory is configured to store computer-executable instructions, and when the apparatus runs, the processor executes the computer-executable instructions stored in the memory, to enable the apparatus to perform the methods described in the foregoing aspects.

According to a fifth aspect, this application provides a communication apparatus, including a unit or a means (means) configured to perform the steps in the foregoing aspects.

According to a sixth aspect, this application provides a communication apparatus, including a processor and a communication interface. The processor is configured to communicate with another apparatus through the communication interface, and perform the methods described in the foregoing aspects. There are one or more processors.

According to a seventh aspect, this application provides a communication apparatus, including a processor, configured to connect to at least one memory, and invoke a program stored in the at least one memory, to perform the methods described in the foregoing aspects. The at least one memory is located inside the apparatus, or is located outside the apparatus. In addition, there are one or more processors.

According to an eighth aspect, this application further provides a computer-readable storage medium. The computer-readable storage medium stores instructions. When the instructions are run on a computer, the computer is enabled to perform the methods described in the foregoing aspects.

According to a ninth aspect, this application further provides a computer program product including instructions. When the computer program product is run on a computer, the computer is enabled to perform the methods described in the foregoing aspects.

According to a tenth aspect, this application further provides a chip system, including a processor, configured to perform the methods described in the foregoing aspects.

According to an eleventh aspect, this application further provides a chip system, including the foregoing provided first terminal device and/or the network device.

According to a twelfth aspect, this application further provides a communication system, including the foregoing provided first terminal device and/or the network device. Optionally, the communication system further includes a core network device.

DESCRIPTION OF EMBODIMENTS

Figure 1:
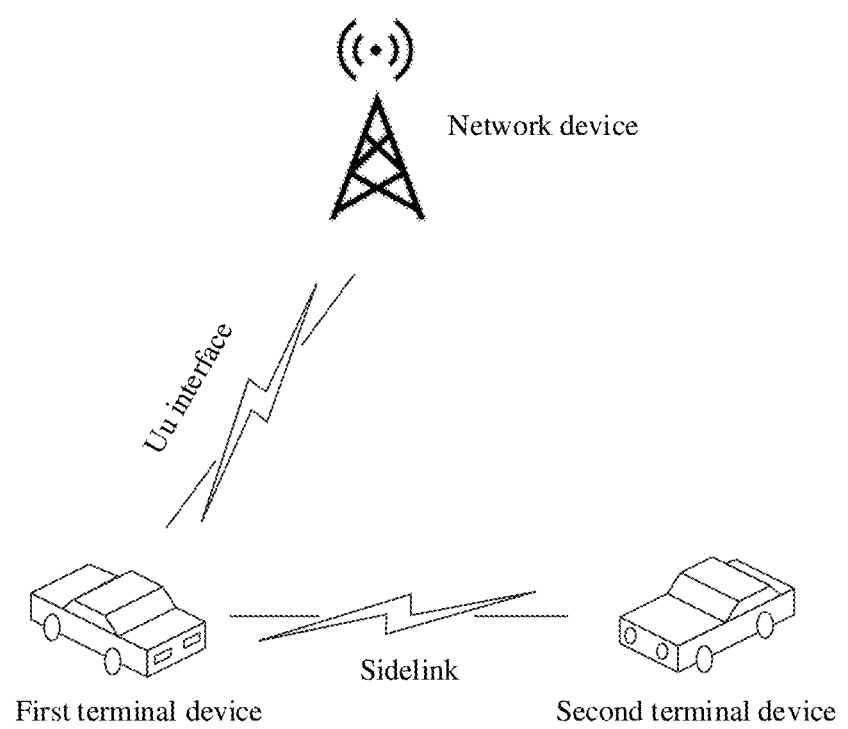
FIG. 1 is a schematic diagram of a network architecture of a communication system according to an embodiment of this application.

The following further describes in detail embodiments of this application with reference to the accompanying drawings.

The following explains and describes some communication nouns or terms used in this application. The communication nouns or the terms are further used as a part of the embodiments content of this application.

1. A sidelink (sidelink, SL) further is referred to as a sidelink and is referred to as a sidelink in embodiments of this application. The sidelink is used for communication between terminal devices, and includes a physical sidelink shared channel (physical sidelink shared channel, PSSCH) and a physical sidelink control channel (physical sidelink control channel, PSCCH). The PSSCH is used to carry sidelink data (SL data), and the PSCCH is used to carry sidelink control information (sidelink control information, SCI). Information included in the SCI is used for sidelink scheduling assignment (sidelink scheduling assignment, SL SA). The SL SA is data-scheduling-related information, for example, is used to carry information such as resource allocation and/or a modulation and coding scheme (modulation and coding scheme, MCS) of the PSSCH.

Optionally, sidelink communication further includes a physical sidelink feedback channel (physical sidelink feedback channel, PSFCH). The physical sidelink feedback channel further is referred to as a sidelink feedback channel for short. The physical sidelink feedback channel is used to transmit sidelink feedback control information (sidelink feedback control information, SFCI), and the sidelink feedback control information further is referred to as sidelink feedback information for short. The sidelink feedback control information includes one or more of the following information: channel state information (channel state information, CSI), hybrid automatic repeat request (hybrid automatic repeat request, HARQ) information, and the like. The HARQ information includes acknowledgement information (acknowledgement, ACK), negative acknowledgement (negative acknowledgement, NACK), or the like.

2. Uu air interface. The Uu air interface is referred to as Uu for short and is used for communication between a terminal device and an access network device. The Uu air interface is understood as a universal air interface between user equipment (user equipment, UE) and a network (universal UE to network interface). Transmission over the Uu air interface includes uplink transmission and downlink transmission.

The uplink transmission means that the terminal device sends information to the access network device, and the information in the uplink transmission is referred to as uplink information or an uplink signal. The uplink information or the uplink signal includes one or more of a PUSCH, a PUCCH, and a sounding reference signal (sounding reference signal, SRS). A channel used to transmit the uplink information, or the uplink signal is referred to as an uplink channel, and the uplink channel includes one or more of a physical uplink data channel (physical uplink shared channel, PUSCH) and a physical uplink control channel (physical uplink control channel, PUCCH). The PUSCH is used to carry uplink data, and the uplink data further is referred to as uplink data information. The PUCCH is used to carry uplink control information (uplink control information, UCI) fed back by the terminal device. For example, the UCI includes one or more of channel state information (channel state information, CSI), an ACK, a NACK, and the like that are fed back by the terminal device.

The downlink transmission means that the access network sends information to the terminal device, and the information in the downlink transmission is downlink information or a downlink signal. The downlink information or the downlink signal includes at least one of a PDSCH, a PDCCH, a channel state information reference signal (channel state information reference signal, CSI-RS), and a phase tracking reference signal (phase tracking reference signal, PTRS). A channel used to transmit downlink information, or a downlink signal is referred to as a downlink channel, and the downlink channel includes one or more of a physical downlink data channel (physical downlink shared channel, PDSCH) and a physical downlink control channel (physical downlink control channel, PDCCH). The PDCCH is used to carry downlink control information (downlink control information, DCI), and the PDSCH is used to carry downlink data (data). The downlink data further is referred to as downlink data information.

3. Channel access process. The channel access process further is referred to as a listen before talk (listen before talk, LBT) process, and is uniformly referred to as the channel access process below. The channel access process includes two types. Type 1: In a channel access process based on fixed duration, a communication device detects the fixed duration, and if energy of a signal that is detected in a channel within the fixed duration is less than a preset threshold, the channel is considered in an idle state. Therefore, the communication device occupies the channel. Otherwise, the communication device needs to contend for a channel again.

Type 2: In a backoff-based channel access process, a communication device randomly selects a value A in a contention window, and determined, after at least A idle slots are detected, that a channel is in the idle state. Therefore, the communication device occupies the channel Otherwise, the communication device needs to contend for a channel again. The idle slot means that energy of a signal detected in the channel in the slot is less than a preset threshold. In this type of channel access process, four channel access priority classes (channel access priority classes, CAPCs) are introduced. Different CAPCs correspond to different channel access parameters. The channel access parameter includes a size of a contention window, a corresponding service status, channel occupancy time (channel occupancy time, COT) information, and the like. The COT is duration for which a channel is used after a channel access process succeeds.

FIG. 1 is a schematic diagram of a network architecture of a communication system to which an embodiment of this application is applicable. The communication system includes a first terminal device and a second terminal device, and certainly further includes another terminal device. For ease of description, another terminal device is not shown herein. A direct communication link between the first terminal device and the second terminal device is a sidelink.

The communication system further includes a network device, and the network device communicates with at least one terminal device (for example, the first terminal device shown in FIG. 1) through a Uu interface.

The network device in FIG. 1 is an access network device, for example, a base station. The access network device corresponds to different devices in different systems. For example, in a 5G system, the access network device corresponds to an access network device in 5G, for example, a gNB. The network device in FIG. 1 is an evolved NodeB (evolved NodeB, eNB) in an LTE system, a base transceiver station (base transceiver station, BTS) in a global system for mobile communications (global system for mobile communications, GSM) system or code division multiple access (code division multiple access, CDMA), or a NodeB (NodeB, NB) in a wideband code division multiple access (wideband code division multiple access, WCDMA) system. Although the first terminal device and the second terminal device are shown in FIG. 1, the network device serves more terminal devices, and a quantity of network devices and a quantity of terminal devices in the communication system are not limited in this embodiment of this application.

The terminal device in FIG. 1 is a device having a wireless transceiver function or a chip that is disposed in any device, or is referred to as user equipment (user equipment, UE), an access terminal, a subscriber unit, a subscriber station, a mobile station, a remote station, a remote terminal, a mobile device, a user terminal, a wireless communication device, a user agent, or a user apparatus. The terminal device in embodiments of this application is a mobile phone (mobile phone), a tablet computer (Pad), a computer having a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like.

The terms "system" and "network" is used interchangeably in embodiments of this application. "A plurality of" means two or more. In view of this, "a plurality of" further is understood as "at least two" in embodiments of this application. "At least one" is understood as one or more, for example, one, two, or more. For example, "including at least one" means including one, two, or more, and does not limit which items are included. For example, if at least one of A, B, and C is included, A, B, C, A and B, A and C, B and C, or A, B, and C is included. Similarly, understanding of descriptions such as "at least one type" is similar. "And/or" describes an association relationship between associated objects and represents those three relationships exists. For example, A and/or B represents three cases: There is A, there are both A and B, and there is B. In addition, the character "/" usually indicates an "or" relationship between the associated objects unless otherwise stated.

Ordinal numbers such as "first" and "second" in embodiments of this application are used to distinguish between a plurality of objects, but are not intended to limit a sequence, a time sequence, priorities, or importance of the plurality of objects. In addition, descriptions of "first" and "second" do not indicate that objects are different.

Figure 2:
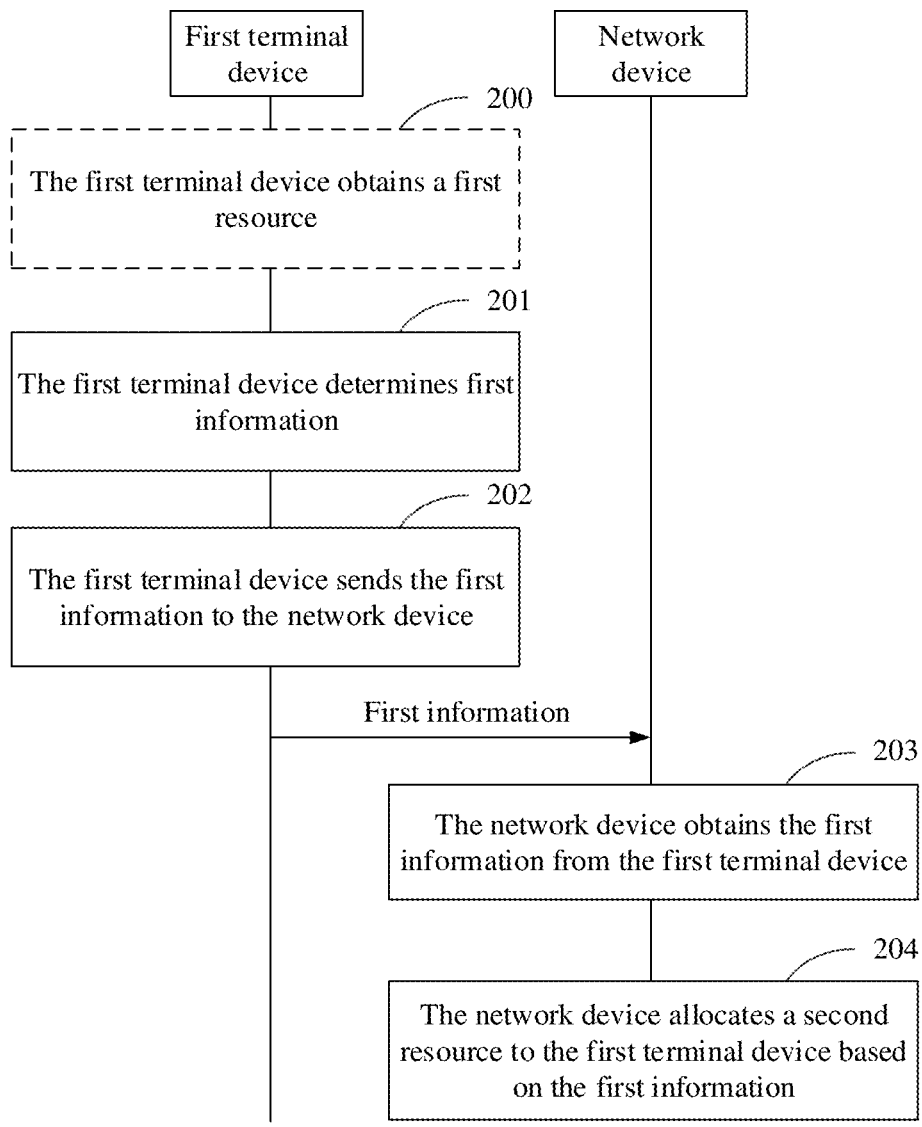
FIG. 2 is a schematic flowchart of a communication method according to an embodiment of this application.

With reference to the foregoing descriptions, FIG. 2 is a schematic flowchart of a communication method according to an embodiment of this application. Refer to FIG. 2. The method includes the following steps.

Step 200: A first terminal device obtains a first resource.

The first resource is used for sidelink communication between the first terminal device and a second terminal device or is used for communication between the first terminal device and a network device. The first resource includes a plurality of resources, and a quantity of included resources is not limited in this embodiment of this application.

The first resource is a resource allocated by the network device to the first terminal device, or is a resource selected by the first terminal device. The first terminal device obtains resources for a plurality of times, and a set of the resources obtained for the plurality of times is referred to as the first resource. For example, the first resource is resources allocated by the network device for a plurality of times, or is resources selected by the first terminal device for a plurality of times.

The first resource is an unlicensed (unlicensed) spectrum resource. As an example, before the first terminal device performs data transmission by using a resource in the first resource, the first terminal device needs to perform a channel access process. If the channel access process succeeds, the first terminal device performs data transmission by using the resource. If the channel access process fails, the first terminal device is unable to perform data transmission by using the resource.

For any resource, when the first terminal device does not complete the channel access process before a transmission start point of the resource, the channel access process fails is determined. In this case, the first terminal device is unable to perform data transmission by using the resource. When the first terminal device completes the channel access process before the transmission start point of the resource, the channel access process succeeds is determined. In this case, the first terminal device performs data transmission by using the resource.

A process in which the first terminal device performs the channel access process is not limited in this embodiment of this application. For details, refer to descriptions of the channel access process in a conventional technology. Details are not described herein.

In this embodiment of this application, in a process of using the first resource, the first terminal device counts a quantity of times for which the channel access process fails. The first terminal device performs counting in any one of the following manners when performing counting.

Manner 1: A quantity of times for which the first terminal device fails to perform the channel access process on a unicast resource in the first resource is counted.

Manner 2: A quantity of times for which the first terminal device fails to perform the channel access process on a multicast resource in the first resource is counted.

Manner 3: A quantity of times for which the first terminal device fails to perform the channel access process on a broadcast resource in the first resource is counted.

Manner 4: A quantity of times for which the first terminal device fails to perform the channel access process on a multicast resource and a broadcast resource in the first resource is counted.

Manner 5: A quantity of times for which the first terminal device fails to perform the channel access process on a unicast resource and a broadcast resource in the first resource is counted.

Manner 6: A quantity of times for which the first terminal device fails to perform the channel access process on a multicast resource and a unicast resource in the first resource is counted.

Manner 7: A quantity of times for which the first terminal device fails to perform the channel access process on a resource that is a part of a preset channel (channel) and that is in the first resource is counted.

Manner 8: A quantity of times for which the first terminal device fails to perform the channel access process on a resource that is a part of a preset subband (subband) and that is in the first resource is counted.

Manner 9: A total quantity of times for which the first terminal device fails to perform the channel access process on the first resource is counted without distinguishing between types of the first resource.

When performing counting, if the first terminal device determines that the channel access process fails for a preset quantity of times, the first terminal device determines that a radio link failure (radio link failure, RLF) occurs. The preset quantity is a preset value, is a value configured by the network device, or is a value determined in another manner. This is not limited herein. For example, the preset quantity is five, and the first terminal device counts, in Manner 9, the quantity of times for which the channel access process fails. When the first terminal device determines that the quantity of times for which the channel access process fails is five, the first terminal device determines that a radio link failure occurs.

When the first terminal device performs counting, in some embodiments, the first terminal device counts a quantity of times for which the channel access process continuously fails. In this manner, the first terminal device starts a counter. Each time the channel access process fails, the first terminal device increases a value of the counter by 1; and each time the channel access process succeeds, or a third timer expires, the first terminal device resets the value of the counter to 0. Each time the channel access process fails, the third timer is started or restarted. When the value of the counter is equal to the preset quantity, the first terminal device determines that a radio link fail occurs. A maximum quantity of times of the counter and duration of the third timer is configured by the network device.

In some embodiments, the first terminal device counts the total quantity of times for which the channel access process fails. In this manner, the first terminal device starts a counter and increase a value of the counter by 1 each time the channel access process fails. The first terminal device uses a finally counted value of the counter as the quantity of times for which the channel access process fails. When the value of the counter is greater than or equal to the preset quantity, the first terminal device determines that radio link fail occurs.

Step 200 and step 201 to step 204 is mutually independent procedures, or is mutually cooperative. This is unlimited in this embodiment of this application.

Step 201: The first terminal device determines first information.

In this embodiment of this application, the first information includes one or more of the following:

1. A result of the channel access process. The result of the channel access process is used to indicate that the first terminal device fails to perform the channel access process.

Optionally, the result of the channel access process further is used to indicate resources on which the channel access process fails and/or resources on which the channel access process succeeds in the first resource.

When obtaining the result of the channel access process performed on the first resource, the network device determines, based on the result of the channel access process performed on the first resource, the resources on which the channel access process fails and the resources on which the channel access process succeeds in the first resource, to determine whether to allocate, to the first terminal device, a resource for retransmission and a quantity of resources for retransmission.

2. Resource request message. The resource request message is used to request a resource for retransmission on a sidelink between the first terminal device and a second terminal device.

Correspondingly, when obtaining the resource request message, the network device determines, based on the resource request message, whether to allocate, to the first terminal device, the resource for retransmission.

Further, optionally, the first information further includes one or more of the following:

3. At least one sidelink carrier identifier. The at least one sidelink carrier identifier is an identifier of a sidelink carrier corresponding to a resource that is in the first resource and on which the channel access process fails, or the at least one sidelink carrier identifier is an identifier of a sidelink carrier corresponding to a resource that is in the first resource and on which the channel access process succeeds.

When the at least one sidelink carrier identifier is the identifier of the sidelink carrier corresponding to the resource on which the channel access process fails, the network device determines, based on the at least one sidelink carrier identifier, the carrier corresponding to the resource on which the channel access process fails, to exclude the carrier corresponding to the at least one sidelink carrier identifier when re-allocating a resource to the first terminal device.

Correspondingly, when the at least one sidelink carrier identifier is the identifier of the sidelink carrier corresponding to the resource on which the channel access process succeeds, the network device determines the carrier corresponding to the resource on which the channel access process succeeds, to allocate, to the first terminal device when re-allocating a resource to the first terminal device, a resource in the carrier corresponding to the at least one sidelink carrier identifier.

4. At least one sidelink hybrid automatic repeat request (hybrid automatic repeat request, HARQ) identifier. The at least one sidelink HARQ identifier is a sidelink HARQ identifier corresponding to a transport block that is in the first resource and on which the first terminal device fails to perform the channel access process, or the at least one sidelink HARQ identifier is a sidelink HARQ identifier corresponding to a resource that is in the first resource and on which the first terminal device successfully sends a transport block.

When performing sidelink communication, the first terminal device maintains at least one HARQ process (process), where each HARQ process has one HARQ identifier, and each HARQ process is used to transmit a different transport block. The network device determines, based on the at least one sidelink HARQ identifier, a transport blocks that fails to be sent.

When allocating a retransmission resource to the first terminal device, the network device indicates, to the first terminal device, a sidelink HARQ identifier corresponding to the retransmission resource. The first terminal device determines the retransmission resource based on the sidelink HARQ identifier indicated by the network device, where the retransmission resource is used to retransmit a transport block corresponding to the sidelink HARQ identifier.

5. Channel access process type information. The channel access process type information is used to indicate a type of the channel access process performed by the first terminal device on the first resource.

As described above, in this embodiment of this application, the channel access process includes two types: Type 1: a channel access process based on fixed duration; and Type 2: a backoff-based channel access process.

The network device determines, based on the channel access process type information, a type of the channel access process used when the first terminal device performs the channel access process. When the network device re-allocates a resource to the first terminal device, the network device indicates the type of the channel access process to the first terminal device. The type that is indicated by the network device and that is of the channel access process is determined based on the channel access process type information.

For example, when the network device determines, based on the result of the channel access process performed on the first resource, that a ratio of a quantity of resources that is in the first resource and on which the channel access process succeeds to a total quantity of resources included in the first resource is greater than a threshold, and the network device determines, based on the channel access process type information, that the type of the channel access process used by the first terminal device is Type 1, the network device indicates the first terminal device to continue to use the Type-1 channel access process to perform the channel access process on the resource allocated by the network device. Another case is not described.

6. Channel access priority class information. The channel access priority class information is used to indicate a channel access priority class used by the first terminal device to perform the channel access process on the first resource.

As described above, different channel access priority classes correspond to different channel access parameters. The channel access parameter includes a size of a contention window, channel occupancy time (channel occupancy time, COT) information, and the like. The network device determines, based on the channel access priority class information, information such as COT of the first terminal device in a resource on which the channel access process succeeds.

7. Information about a quantity of times for which the channel access process fails. The information about the quantity of times for which the channel access process fails is used to indicate a quantity of times for which the channel access process is performed, where the quantity corresponds to each resource that is in the first resource and on which the channel access process fails.

With reference to the foregoing at least one sidelink carrier identifier, the network device determines, based on the information about the quantity of times for which the channel access process fails and the at least one sidelink carrier identifier, a carrier with a large quantity of times for which the first terminal device fails to perform the channel access process. When the network device allocates a resource to the first terminal device, the network device avoids allocating, to the first terminal device, a resource in the carrier with the large quantity of times for which the channel access process fails.

8. Sidelink type information. The sidelink type information is used to indicate a resource type corresponding to a resource that is in the first resource and on which the channel access process fails.

As described in step 200, when the first terminal device counts the quantity of times for which the channel access process fails on the first resource, the first terminal device performs counting based on a resource type corresponding to the first resource. The sidelink type information herein is a resource type corresponding to a counted resource when the first device counts the resource on which the channel access process fails. As described above, the resource type includes any one of the following:

a unicast resource;
a multicast resource;
a broadcast resource;
a unicast resource and a multicast resource;
a multicast resource and a broadcast resource;
a broadcast resource and a unicast resource;
a resource that is a part of a preset channel;
a resource that is a part of a preset subband; and
all types of resources, namely, a unicast resource, a multicast resource, and a broadcast resource.

Step 202: The first terminal device sends the first information to the network device.

The first information is transmitted by using physical layer signaling, a media access control (media access control, MAC) control element (control element, CE), or the like. This is not limited in this embodiment of this application.

Step 203: The network device obtains the first information from the first terminal device.

Step 204: The network device allocates a second resource to the first terminal device based on the first information.

The second resource is used for the sidelink communication between the first terminal device and the second terminal device, or is used for the communication between the first terminal device and the network device.

For example, in step 200, when determining that a radio link failure occurs, or determining that the quantity of times for which the channel access process fails is greater than or equal to the preset quantity, the first terminal device starts a second timer. Timing duration of the second timer is preset or is configured by the network device. This is not limited in this embodiment of this application. The first terminal device performs a radio link restoration process during running of the second timer.

When the second timer expires, if the radio link restoration process fails, the first terminal device triggers a radio link re-establishment process.

During running of the second timer, the first terminal device is allowed to perform bandwidth part (bandwidth part, BWP) switching. During running of the second timer, the first terminal device is switched from a first BWP to which the first resource belongs to a second BWP. The second BWP is any BWP configured by the network device for the first terminal device.

When the second timer expires, and the first terminal device fails to perform radio link restoration for a cell, the first terminal device performs a cell selection process to select a cell, perform a random access process by using the cell, and send a re-establishment request to the network device by using the random access process. After receiving the re-establishment request, the network device sends a response message to the first terminal device for re-establishment.

Before step 201, the first terminal device determines to send the first information to the network device when determining that any one of the following conditions is satisfied.

Condition 1: The first terminal device receives second information from the network device, where the second information is used to indicate the first terminal device to send the first information.

In Condition 1, the network device directly indicates, by using the second information, the first terminal device to send the second information. When receiving the second information, the first terminal device sends the first information to the network device.

The second information further is used to schedule an uplink resource, and the uplink resource scheduled by using the second information is used by the first terminal device to send the first information. The uplink resource scheduled by using the second information is located on a licensed spectrum, or is located on an unlicensed spectrum. This is not limited in this embodiment of this application.

Condition 2: When receiving third information or the second information from the network device, the first terminal device starts or restarts a first timer. Timing duration of the first timer is preset duration, or is duration configured by the network device.

During running of the first timer, the first terminal device restarts the first timer when receiving the third information or the second information. When the first timer expires, if the first terminal device does not receive the third information or the second information during running of the first timer, the first terminal device determines that the first information needs to be sent to the network device.

A meaning of the second information is the same as the meaning of the second information in Condition 1, and details are not described herein again. Before the first terminal device determines to send the first information to the network device, the network device has allocated a resource to the first terminal device. The third information is used to indicate a part or all of resources in the first resource. That is, the third information is information about the resource allocated by the network device to the first terminal device.

In Condition 2, the first timer is set, so that the first terminal device sends the first information to the network device at intervals of a time period, and this avoids a case in which the network device is unable to determine resource utilization of the first terminal device because the first terminal device does not report a resource usage result for a long time.

Condition 3: The first terminal device determines that a quantity of times for which the channel access process fails on the first resource is equal to a preset quantity.

For how the first terminal device determines the quantity of times for which the channel access process fails, refer to the descriptions in step 200. Details are not described herein again.

The foregoing conditions are merely examples, and there is other conditions, which are not described herein by using examples one by one.

Finally, in step 204, the network device allocates the second resource to the first terminal device based on the first information. For how the network device allocates the second resource, refer to the foregoing descriptions. When allocating the second resource, the network device refers to the first information, and does not allocate the second resource based on the first information. For example, the first information requests to allocate a resource. If the network device determines that there is no resource that is allocated currently, the network device skips allocating the second resource to the first terminal device. Another case is not described.

Embodiments described in this specification is independent solutions, or is combined based on internal logic. These solutions fall within the protection scope of this application.

In the foregoing method embodiment the methods and the operations implemented by the terminal device alternatively is implemented by a component (for example, a chip or a circuit) used in the terminal device, and the methods and the operations implemented by the network device alternatively is implemented by a component (for example, a chip or a circuit) used in the network device.

The foregoing mainly describes, from a perspective of interaction between network elements, solutions provided in this application. To implement the foregoing functions, each network element includes a corresponding hardware structure and/or software module for implementing each function. A person skilled in the art is easily aware that units, algorithms, and steps in the examples described with reference to embodiments disclosed in this specification is implemented by hardware or a combination of hardware and computer software in the present embodiments. Whether a function is performed by hardware or hardware driven by computer software depends on particular applications and design constraints of the technical solutions. A person skilled in the art uses different methods to implement the described functions for each particular application, but the implementation goes beyond the scope of the present embodiments.

Figure 3:
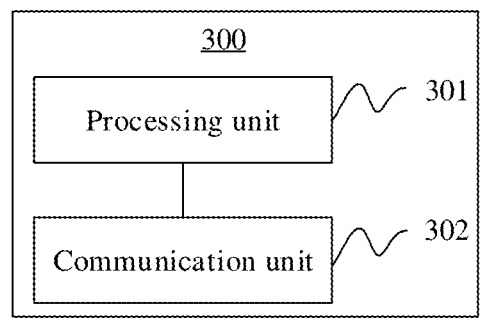
FIG. 3 is a schematic diagram of a structure of a communication apparatus according to an embodiment of this application.

FIG. 3 is a possible example block diagram of a communication apparatus 300 according to this application. The apparatus 300 exists in a form of software or hardware. The apparatus 300 includes a processing unit 301 and a communication unit 302. In an implementation, the communication unit 302 includes a receiving unit and a sending unit. The processing unit 301 is configured to control and manage an action of the apparatus 300. The communication unit 302 is configured to support the apparatus 300 in communicating with another network entity.

When the apparatus 300 is configured to implement a function of the first terminal device in the foregoing method embodiment, the processing unit 301 is configured to determine first information, where the first information includes a result of a channel access process performed on a first resource, and the first resource is used for sidelink communication between the first terminal device and a second terminal device, or is used for communication between the first terminal device and a network device; or the first information includes a resource request message, and the resource request message is used to request a resource for retransmission on a sidelink between the first terminal device and a second terminal device; and the communication unit 302 is configured to send the first information to the network device.

In some embodiments, the processing unit 301 is configured to:

when second information from the network device is received, determine the first information, where the second information is used to indicate the first terminal device to send the first information;

when third information or the second information from the network device is received, start or restart a first timer, and when the first timer expires, determine the first information, where the third information is used to indicate a part or all of resources in the first resource; or when determining that a quantity of times for which the channel access process fails on the first resource is equal to a preset quantity, determine the first information.

In some embodiments, the quantity of times for which the channel access process fails on the first resource is a quantity of times for which the channel access process fails on a unicast resource in the first resource;

is a quantity of times for which the channel access process fails on a multicast resource in the first resource;

is a quantity of times for which the channel access process fails on a broadcast resource in the first resource;

is a quantity of times for which the channel access process fails on a multicast resource and a broadcast resource in the first resource;

is a quantity of times for which the channel access process fails on a unicast resource and a broadcast resource in the first resource;

is a quantity of times for which the channel access process fails on a multicast resource and a unicast resource in the first resource;

is a quantity of times for which the channel access process fails on a resource that is a part of a preset channel and that is in the first resource;

is a quantity of times for which the channel access process fails on a resource that is a part of a preset subband and that is in the first resource; or is a total quantity of times for which the channel access process fails on the first resource.

In some embodiments, the first information further includes any one or more of the following:

at least one sidelink carrier identifier, where the at least one sidelink carrier identifier is an identifier of a sidelink carrier corresponding to a resource that is in the first resource and on which the channel access process fails, or the at least one sidelink carrier identifier is an identifier of a sidelink carrier corresponding to a resource that is in the first resource and on which the channel access process succeeds;

at least one sidelink hybrid automatic repeat request HARQ identifier, where the at least one sidelink HARQ identifier is a sidelink HARQ identifier corresponding to a resource that is in the first resource and on which the first terminal device fails to send a transport block, or the at least one sidelink HARQ identifier is a sidelink HARQ identifier corresponding to a resource that is in the first resource and on which a transport block is successfully sent;

channel access process type information, used to indicate a type of the channel access process performed on the first resource;

channel access priority class information, used to indicate a channel access priority class CAPC used to perform the channel access process on the first resource;

information about a quantity of times for which the channel access process fails, used to indicate a quantity of times for which the channel access process is performed, where the quantity corresponds to each resource that is in the first resource and on which the channel access process fails; and sidelink type information, used to indicate a resource type corresponding to a resource that is in the first resource and on which the channel access process fails.

In some embodiments, the processing unit 301 is further configured to:

when determining that the quantity of times for which the channel access process fails on the first resource is equal to the preset quantity, start a second timer, and perform a radio link restoration process during running of the second timer.

In some embodiments, the processing unit 301 is further configured to:

when the second timer expires, if the radio link restoration process fails, trigger a radio link re-establishment process.

When the apparatus 300 is configured to implement a function of network device in the foregoing method embodiment, the communication unit 302 is configured to obtain first information from a first terminal device, where the first information includes a result of a channel access process performed on a first resource, and the first resource is used for sidelink communication between the first terminal device and a second terminal device, or is used for communication between the first terminal device and the network device; or the first information includes a resource request message, and the resource request message is used to request a resource for retransmission on a sidelink between the first terminal device and a second terminal device; and the processing unit 301 is configured to allocate a second resource to the first terminal device based on the first information.

In some embodiments, the second resource is used for the sidelink communication between the first terminal device and the second terminal device, or is used for the communication between the first terminal device and the network device.

In some embodiments, the first information further includes any one or more of the following:

at least one sidelink carrier identifier, where the at least one sidelink carrier identifier is an identifier of a sidelink carrier corresponding to a first resource that is in the first resource and on which the channel access process fails, or the at least one sidelink carrier identifier is an identifier of a sidelink carrier corresponding to a resource that is in the first resource and on which the channel access process succeeds;

at least one sidelink hybrid automatic repeat request HARQ identifier, where the at least one sidelink HARQ identifier is a HARQ identifier corresponding to a resource that is in the first resource and on which the first terminal device fails to send a transport block, or the at least one sidelink HARQ identifier is a HARQ identifier corresponding to a resource that is in the first resource and on which the first terminal device successfully sends a transport block;

channel access process type information, used to indicate a type of the channel access process performed by the first terminal device on the first resource;

channel access priority class information, used to indicate a channel access priority class CAPC used by the first terminal device to perform the channel access process on the first resource;

information about a quantity of times for which the channel access process fails, used to indicate a quantity of times for which the channel access process is performed, where the quantity corresponds to each resource that is in the first resource and on which the channel access process fails; and sidelink type information, used to indicate a resource type corresponding to a resource that is in the first resource and on which the channel access process fails.

Figure 4:
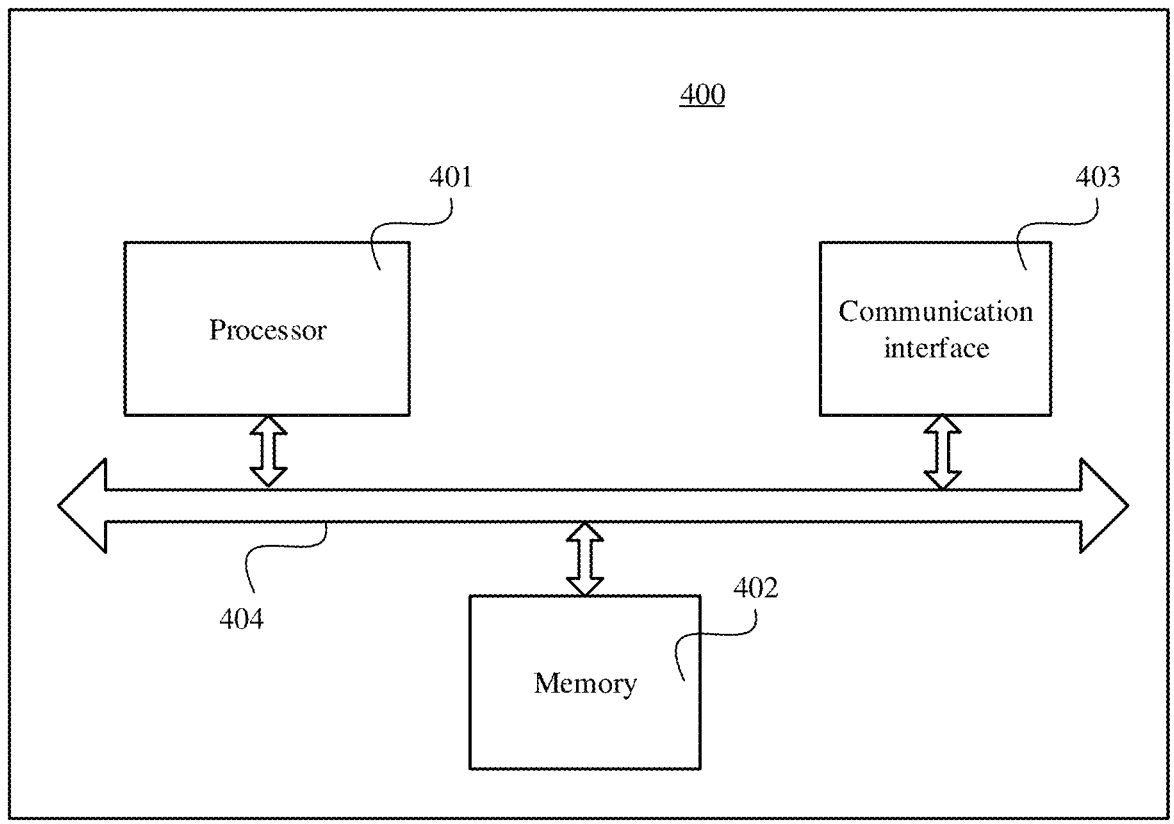
FIG. 4 is a schematic diagram of a structure of a communication apparatus according to an embodiment of this application.

FIG. 4 shows an apparatus 400 according to an embodiment of this application. The apparatus shown in FIG. 4 is an implementation of a hardware circuit of the apparatus shown in FIG. 3. The communication apparatus is applicable to the flowchart shown above, and performs the function of the first terminal device or the network device in the foregoing method embodiment. For ease of description, FIG. 4 shows main components of the communication apparatus.

The apparatus 400 shown in FIG. 4 includes at least one processor 401. For example, the processor 401 is a general-purpose central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processing module implements or execute various example logical blocks, modules, and circuits described with reference to content disclosed in this application. Alternatively, the processor is a combination of processors implementing a computing function, for example, a combination of one or more microprocessors, or a combination of a DSP and a microprocessor.

The apparatus 400 further includes at least one memory 402, configured to store program instructions and/or data. The memory 402 is coupled to the processor 401. Coupling in embodiments of this application is an indirect coupling or a communication connection between apparatuses, units, or modules, is in an electrical, a mechanical, or another form, and is used for information exchange between the apparatuses, the units, or the modules. The processor 401 cooperates with the memory 402. The processor 401 executes the program instructions stored in the memory 402. At least one of the at least one memory is included in the processor.

The apparatus 400 further includes a communication interface 403, configured to communicate with another device by using a transmission medium, so that the apparatus in the apparatus 400 communicates with another device. In this embodiment of this application, the communication interface is a transceiver, a circuit, a bus, a module, or a communication interface of another type. In this embodiment of this application, the transceiver is an independent receiver, an independent transmitter, a transceiver with an integrated receiving and transmitting function, or an interface circuit.

The apparatus 400 further includes a communication line 404. The communication interface 403, the processor 401, and the memory 402 is connected to each other through the communication line 404. The communication line 404 is a peripheral component interconnect (peripheral component interconnect, PCI for short) bus, an extended industry standard architecture (extended industry standard architecture, EISA for short) bus, or the like. The communication line 404 is classified into an address bus, a data bus, a control bus, and the like. For ease of representation, one thick line is used to represent the bus in FIG. 4, but this does not mean that there is one bus or one type of bus.

When the apparatus 400 is configured to implement a function of the first terminal device in the foregoing method embodiment, the processor 401 is configured to determine first information, where the first information includes a result of a channel access process performed on a first resource, and the first resource is used for sidelink communication between the first terminal device and a second terminal device, or is used for communication between the first terminal device and a network device; or the first information includes a resource request message, and the resource request message is used to request a resource for retransmission on a sidelink between the first terminal device and a second terminal device; and the communication interface 403 is configured to send the first information to the network device.

In some embodiments, the processor 401 is configured to:

when second information from the network device is received, determine the first information, where the second information is used to indicate the first terminal device to send the first information;

when third information or the second information from the network device is received, start or restart a first timer, and when the first timer expires, determine the first information, where the third information is used to indicate a part or all of resources in the first resource; or when determining that a quantity of times for which the channel access process fails on the first resource is equal to a preset quantity, determine the first information.

In some embodiments, the quantity of times for which the channel access process fails on the first resource is a quantity of times for which the channel access process fails on a unicast resource in the first resource;

is a quantity of times for which the channel access process fails on a multicast resource in the first resource;

is a quantity of times for which the channel access process fails on a broadcast resource in the first resource;

is a quantity of times for which the channel access process fails on a multicast resource and a broadcast resource in the first resource;

is a quantity of times for which the channel access process fails on a unicast resource and a broadcast resource in the first resource;

is a quantity of times for which the channel access process fails on a multicast resource and a unicast resource in the first resource;

is a quantity of times for which the channel access process fails on a resource that is a part of a preset channel and that is in the first resource;

is a quantity of times for which the channel access process fails on a resource that is a part of a preset subband and that is in the first resource; or is a total quantity of times for which the channel access process fails on the first resource.

In some embodiments, the first information further includes any one or more of the following:

at least one sidelink carrier identifier, where the at least one sidelink carrier identifier is an identifier of a sidelink carrier corresponding to a resource that is in the first resource and on which the channel access process fails, or the at least one sidelink carrier identifier is an identifier of a sidelink carrier corresponding to a resource that is in the first resource and on which the channel access process succeeds;

at least one sidelink hybrid automatic repeat request HARQ identifier, where the at least one sidelink HARQ identifier is a sidelink HARQ identifier corresponding to a resource that is in the first resource and on which the first terminal device fails to send a transport block, or the at least one sidelink HARQ identifier is a sidelink HARQ identifier corresponding to a resource that is in the first resource and on which a transport block is successfully sent;

channel access process type information, used to indicate a type of the channel access process performed on the first resource;

channel access priority class information, used to indicate a channel access priority class CAPC used to perform the channel access process on the first resource;

information about a quantity of times for which the channel access process fails, used to indicate a quantity of times for which the channel access process is performed, where the quantity corresponds to each resource that is in the first resource and on which the channel access process fails; and sidelink type information, used to indicate a resource type corresponding to a resource that is in the first resource and on which the channel access process fails.

In some embodiments, the processor 401 is further configured to:

when determining that the quantity of times for which the channel access process fails on the first resource is equal to the preset quantity, start a second timer, and perform a radio link restoration process during running of the second timer.

In some embodiments, the processor 401 is further configured to:

when the second timer expires, if the radio link restoration process fails, trigger a radio link re-establishment process.

When the apparatus 400 is configured to implement a function of network device in the foregoing method embodiment, the communication interface 403 is configured to obtain first information from a first terminal device, where the first information includes a result of a channel access process performed on a first resource, and the first resource is used for sidelink communication between the first terminal device and a second terminal device, or is used for communication between the first terminal device and the network device; or the first information includes a resource request message, and the resource request message is used to request a resource for retransmission on a sidelink between the first terminal device and a second terminal device; and the processor 401 is configured to allocate a second resource to the first terminal device based on the first information.

In some embodiments, the second resource is used for the sidelink communication between the first terminal device and the second terminal device, or is used for the communication between the first terminal device and the network device.

In some embodiments, the first information further includes any one or more of the following:

at least one sidelink carrier identifier, where the at least one sidelink carrier identifier is an identifier of a sidelink carrier corresponding to a first resource that is in the first resource and on which the channel access process fails, or the at least one sidelink carrier identifier is an identifier of a sidelink carrier corresponding to a resource that is in the first resource and on which the channel access process succeeds;

at least one sidelink hybrid automatic repeat request HARQ identifier, where the at least one sidelink HARQ identifier is a HARQ identifier corresponding to a resource that is in the first resource and on which the first terminal device fails to send a transport block, or the at least one sidelink HARQ identifier is a HARQ identifier corresponding to a resource that is in the first resource and on which the first terminal device successfully sends a transport block;

channel access process type information, used to indicate a type of the channel access process performed by the first terminal device on the first resource;

channel access priority class information, used to indicate a channel access priority class CAPC used by the first terminal device to perform the channel access process on the first resource;

information about a quantity of times for which the channel access process fails, used to indicate a quantity of times for which the channel access process is performed, where the quantity corresponds to each resource that is in the first resource and on which the channel access process fails; and sidelink type information, used to indicate a resource type corresponding to a resource that is in the first resource and on which the channel access process fails.

A person skilled in the art understands that embodiments of this application is provided as a method, a system, or a computer program product. Therefore, this application uses a form of hardware embodiments, software embodiments, or embodiments with a combination of software and hardware. Moreover, this application uses a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. Computer program instructions are used to implement each process and/or each block in the flowcharts and/or the block diagrams and a combination of a process and/or a block in the flowcharts and/or the block diagrams. These computer program instructions are provided for a general-purpose computer, a dedicated computer, an embedded processor, or a processor of another programmable data processing device to generate a machine, so that the instructions executed by the computer or the processor of another programmable data processing device generate an apparatus for implementing a function in one or more processes in the flowcharts and/or in one or more blocks in the block diagrams.

These computer program instructions are stored in a computer-readable memory that indicates the computer or another programmable data processing device to work in a manner, so that the instructions stored in the computer-readable memory generate an artifact that includes an instruction apparatus. The instruction apparatus implements the function in one or more processes in the flowcharts and/or in one or more blocks in the block diagrams.

A person skilled in the art is able to make various modifications and variations to this application without departing from the scope of this application. This application is intended to cover these modifications and variations of this application provided that these modifications and variations fall within the scope of the claims of this application and the modifications and variations equivalent technologies.

What is claimed is:

1. A communication method, comprising:
   receiving, by a first terminal device, a plurality of resources;
   selecting, by the first terminal device, a resource from the plurality of resources as a first resource for sidelink communication with a second terminal device, wherein the first resource is an unlicensed spectrum resource;
   determining, by the first terminal device, whether a quantity of times for which a channel access process, that is also a listen before talk (LBT) process, fails on the first resource is equal to a preset quantity;
   in response to determining that the quantity of times for which the channel access process fails on the first resource is equal to the preset quantity, determining, by the first terminal device, first information, wherein the first information includes:
      a result of the channel access process, wherein the result indicates that the first terminal device fails to perform the channel access process, and the result further indicates the first resource on which the channel access process fails; and
   sending, by the first terminal device, the first information to a network device.

2. The method according to claim 1, wherein the quantity of times for which the channel access process fails on the first resource is one of the following:
   a quantity of times for which the first terminal device fails to perform the channel access process on a unicast resource in the first resource;
   a quantity of times for which the first terminal device fails to perform the channel access process on a multicast resource in the first resource;
   a quantity of times for which the first terminal device fails to perform the channel access process on a broadcast resource in the first resource;
   a quantity of times for which the first terminal device fails to perform the channel access process on the multicast resource and the broadcast resource in the first resource;
   a quantity of times for which the first terminal device fails to perform the channel access process on the unicast resource and the broadcast resource in the first resource;
   a quantity of times for which the first terminal device fails to perform the channel access process on the multicast resource and the unicast resource in the first resource;
   a quantity of times for which the first terminal device fails to perform the channel access process on a resource that is a part of a preset channel and that is in the first resource;
   a quantity of times for which the first terminal device fails to perform the channel access process on a resource that is a part of a preset subband and that is in the first resource; or a total quantity of times for which the first terminal device fails to perform the channel access process on the first resource.

3. The method according to claim 1, wherein the first information further comprises at least one of the following:
   at least one sidelink carrier identifier corresponding to a resource that is in the first resource and on which the channel access process fails, or corresponding to the resource that is in the first resource and on which the channel access process succeeds;
   at least one sidelink hybrid automatic repeat request (HARQ) identifier corresponding to a resource that is in the first resource and on which the first terminal device fails to send a transport block, or corresponding to a resource that is in the first resource and on which the first terminal device successfully sends a transport block;
   channel access process type information, used to indicate a type of the channel access process performed by the first terminal device on the first resource;
   channel access priority class information, used to indicate a channel access priority class (CAPC) used by the first terminal device to perform the channel access process on the first resource;
   information about a quantity of times for which the channel access process fails, used to indicate a quantity of times for which the channel access process is performed, wherein the quantity of times for which the channel access process fails corresponds to each resource that is in the first resource and on which the channel access process fails; or
   sidelink type information, used to indicate a resource type corresponding to a resource that is in the first resource and on which the channel access process fails.

4. The method according to claim 1, further comprising:
   in response to determining that the quantity of times for which the channel access process fails on the first resource is equal to the preset quantity,
      starting, by the first terminal device, a second timer, and performing, by the first terminal device, a radio link restoration process during running of the second timer.

5. The method according to claim 4, further comprising:
   in response to expiration of the second timer and failure of the radio link restoration process,
      triggering, by the first terminal device, a radio link re-establishment process.

6. A communication method, comprising:
   allocating, by a network device, a plurality of resources to a first terminal device for the first terminal device to select a resource from the plurality of resources as a first resource for sidelink communication between the first terminal device and a second terminal device, wherein the first resource is an unlicensed spectrum resource; and obtaining, by the network device, first information from the first terminal device, wherein
the first terminal device determines whether a quantity of times for which a channel access process, that is also a listen before talk (LBT) process, fails on the first resource is equal to a preset quantity,
the first terminal device determines the first information in response to determining that the quantity of times for which the channel access process fails on the first resource is equal to the preset quantity, and
the first information includes a result of the channel access process, wherein the result indicates that the first terminal device fails to perform the channel access process, and the result further indicates the first resource on which the channel access process fails.

7. The method according to claim 6, further comprising:
allocating, by the network device, a second resource to the first terminal device based on the first information, wherein the second resource is used for the sidelink communication between the first terminal device and the second terminal device, or is used for the communication between the first terminal device and the network device.

8. The method according to claim 6, wherein the first information further comprises one or more of the following:
at least one sidelink carrier identifier corresponding to a first resource that is in the first resource and on which the channel access process fails, or corresponding to a resource that is in the first resource and on which the channel access process succeeds;
at least one sidelink hybrid automatic repeat request (HARQ) identifier corresponding to a resource that is in the first resource and on which the first terminal device fails to send a transport block, or corresponding to a resource that is in the first resource and on which the first terminal device successfully sends a transport block;
channel access process type information, used to indicate a type of the channel access process performed by the first terminal device on the first resource;
channel access priority class information, used to indicate a channel access priority class (CAPC) used by the first terminal device to perform the channel access process on the first resource;
information about a quantity of times for which the channel access process fails, used to indicate a quantity of times for which the channel access process is performed, wherein the quantity of times for which the channel access process fails corresponds to each resource that is in the first resource and on which the channel access process fails; and
sidelink type information, used to indicate a resource type corresponding to a resource that is in the first resource and on which the channel access process fails.

9. A non-transitory computer readable medium, wherein the non-transitory computer readable medium stores instructions that are executable by a computer to perform operations comprising:
receiving, by a first terminal device, a plurality of resources;
selecting, by the first terminal device, a resource from the plurality of resources as a first resource for sidelink communication with a second terminal device, wherein the first resource is an unlicensed spectrum resource;
determining, by the first terminal device, whether a quantity of times for which a channel access process, that is also a listen before talk (LBT) process, fails on the first resource is equal to a preset quantity;
in response to determining that the quantity of times for which the channel access process fails on the first resource is equal to the preset quantity, determining, by the first terminal device, first information that includes a result of the channel access process, wherein the result indicates that the first terminal device fails to perform the channel access process, and the result further indicates the first resource on which the channel access process fails; and
sending, by the first terminal device, the first information to a network device.

10. The non-transitory computer readable medium according to claim 9, wherein the quantity of times for which the channel access process fails on the first resource is one or more of the following:
a quantity of times for which the first terminal device fails to perform the channel access process on a unicast resource in the first resource;
a quantity of times for which the first terminal device fails to perform the channel access process on a multicast resource in the first resource;
a quantity of times for which the first terminal device fails to perform the channel access process on a broadcast resource in the first resource;
a quantity of times for which the first terminal device fails to perform the channel access process on the multicast resource and the broadcast resource in the first resource;
a quantity of times for which the first terminal device fails to perform the channel access process on the unicast resource and the broadcast resource in the first resource;
a quantity of times for which the first terminal device fails to perform the channel access process on the multicast resource and the unicast resource in the first resource;
a quantity of times for which the first terminal device fails to perform the channel access process on a resource that is a part of a preset channel and that is in the first resource;
a quantity of times for which the first terminal device fails to perform the channel access process on a resource that is a part of a preset subband and that is in the first resource; or
a total quantity of times for which the first terminal device fails to perform the channel access process on the first resource.

11. The non-transitory computer readable medium according to claim 9, wherein the first information further comprises any one or more of the following:
at least one sidelink carrier identifier corresponding to a resource that is in the first resource and on which the channel access process fails, or corresponding to a resource that is in the first resource and on which the channel access process succeeds.

12. The non-transitory computer readable medium according to claim 10, wherein the operations further comprise:
in response to determining that the quantity of times for which the channel access process fails on the first resource is equal to the preset quantity, starting, by the first terminal device, a second timer, and performing, by the first terminal device, a radio link restoration process during running of the second timer.

13. The non-transitory computer readable medium according to claim 12, wherein the operations further comprise:
in response to expiration of the second timer and failure of the radio link restoration process,
triggering, by the first terminal device, a radio link re-establishment process.

14. The non-transitory computer readable medium according to claim 9, wherein the first information further comprises:
at least one sidelink hybrid automatic repeat request (HARQ) identifier corresponding to a resource that is in the first resource and on which the first terminal device fails to send a transport block, or corresponding to a resource that is in the first resource and on which the first terminal device successfully sends a transport block.

15. The non-transitory computer readable medium according to claim 9, wherein the first information further comprises:
channel access process type information, used to indicate a type of the channel access process performed by the first terminal device on the first resource.

16. The non-transitory computer readable medium according to claim 9, wherein the first information further comprises:
channel access priority class information, used to indicate a channel access priority class (CAPC) used by the first terminal device to perform the channel access process on the first resource.

17. The non-transitory computer readable medium according to claim 9, wherein the first information further comprises:
information about a quantity of times for which the channel access process fails, used to indicate a quantity of times for which the channel access process is performed, wherein the quantity of times for which the channel access process fails corresponds to each resource that is in the first resource and on which the channel access process fails.

18. The non-transitory computer readable medium according to claim 9, wherein the first information further comprises:
sidelink type information, used to indicate a resource type corresponding to a resource that is in the first resource and on which the channel access process fails.

* * * * *